3,125,434
CONDITIONED AMMONIA DERIVATIVE COMPOSITION
Homer A. Smith, Berkeley Heights, and Edgar W. Sawyer, Jr., Metuchen, N.J., assignors to Minerals & Chemicals Philipp Corporation, a corporation of Maryland
No Drawing. Filed Apr. 11, 1958, Ser. No. 727,769
15 Claims. (Cl. 71—28)

The instant invention relates to an improved composition of matter, such composition consisting of discrete material which tends to coalesce due to heat, pressure and/or moisture in the surrounding atmosphere and finely divided particles of a mineral coating particles of said discrete material to form a continuous barrier around each of the particles of the first mentioned material to prevent coalescence due to heat, pressure and/or moisture absorption thereby. More specifically, the invention relates to such a composition in which said discrete material comprises a hygroscopic ammonia derivative.

Our invention is of very wide application, having utility in the provision of new compositions of matter in numerous fields. One of the fields in which our invention is particularly useful is in the manufacture of fertilizers and purely for purposes of explanation and illustration we shall explain our invention in connection with its employment in granular fertilizer manufacture.

The tendency of hygroscopic materials to coalesce is caused by the varying ambient conditions of temperature and humidity and the effects of pressure. Changes of temperature and humidity upward cause greater absorption of water in which a portion of the crystals become dissolved. With subsequent lowering of temperature and/or humidity, the dissolved material recrystallizes and coalesces with the existent granules or other recrystallized material. This is the basis of phenomenon of caking. When certain fertilizer, or other compositions comprising a hygroscopic solid, is stored over long periods of time this process repeats itself and becomes more pronounced until the bag of fertilizer, or other hygroscopic solid, becomes a solid cohesive mass.

The problem exists, for example, in the handling of mixed fertilizer which may be made by assembling and admixing ingredients such, for example, as potash, superphosphate, ammonium sulfate and a solution of ammonium nitrate and aqueous ammonia. The admixed ingredients are delivered from the reactor, either through a cooler or not, as desired, onto a stockpile where the fertilizer is cooled. The fertilizer is hygroscopic and tends to absorb moisture. Hence, the fertilizer in the pile becomes caked and has to be ground, after which it is bagged for shipment. Preferably the mixed fertilizer is prepared as a granular material, usually within the range of from about 5 to 35-mesh, it having been found that granules, although prone to coalesce, are more resistant to coalescence than comminuted material of like composition. The bagged mixed fertilizer granules are still hygroscopic and become caked in the bags due to heat, pressure or moisture absorption, such caking seriously impairing the utility of the fertilizer, as is well-known to those skilled in the art. An analogous problem exists in the storage of other hygroscopic fertilizers exemplified by ammonium nitrate, urea, ammonium sulfate, ammonium phosphate, sodium nitrate, acidulated phosphate and potassium chloride. The tendency towards setting or caking has restricted the use of such plant nutrient source since in the caked condition such materials are not amenable to even field distribution. In recent years such fertilizers have become available in granular or macrocrystalline form, thereby to reduce the point of contact between particles and restrict the tendency of the particles to coalesce. Although the provision of granules or macrocrystals provides some benefits nevertheless the problem is by no means eliminated. Ammonium nitrate prills, for example, even when calcium carbonate is intimately admixed therewith, absorb moisture and cake together during exposure to heat, pressure or an atmosphere of relatively high humidity.

Numerous proposals have been heretofore made to curtail the caking or setting of such hygroscopic material. One of the most effective and inexpensive of such methods involves forming a continuous coating of comminuted material around individual particles of hygroscopic material thereby to provide a barrier between individual particles of hygroscopic material and inhibit their tendency to coalesce. Diatomaceous earth, a variety of clays and various synthetic siliceous powders have been recommended for the purpose.

Comminuted siliceous materials used in such a mode as conditioners must have a low bulk density and preferably be of a sorptive character. Such materials must be provided as particles of sufficiently fine particle size and in quantity sufficient to form a continuous tenacious barrier around each discrete particle of hygroscopic material to be conditioned. Useful siliceous minerals are those which do not spall, gel or otherwise lose their physical form in the presence of large quantities of moisture so the appearance and handling of the composited fertilizer is not adversely affected by the presence of the conditioner.

Clays are characterized by being made up of one or more hydrous aluminum silicates which are commonly referred to as clay minerals. Magnesium or iron may be substituted in part for the aluminum in some clay minerals and alkalies or calcium may be present as essential constituents in some of them. Some clays are composed of a single clay mineral while others are made up of a mixture of clay minerals. In addition, some clays contain amounts of non-clay minerals such as pyrite, quartz, feldspar, etc. Clay minerals useful as conditioners are characterized by fine particle size, low bulk density, adherability to surfaces of hygroscopic material and preferential sorptivity for water. Clays heretofore proposed for the purpose include attapulgite, certain sorptive montmorillonite minerals and, to a lesser extent, kaolinitic minerals. Also, mixtures of clay minerals may be used or mixtures of at least one clay mineral and diatomaceous earth. All of the favored conditioning minerals hereinabove described are siliceous; diatomaceous earth consisting essentially of silica and clays being aluminosilicates.

Among the most successful and inexpensive comminuted minerals thus employed for conditioning a variety of hygroscopic chemicals and fertilizers against caking has been the clay mineral attapulgite suitably thermally activated to destroy its gel-forming properties. This activated mineral, in communited form, when compacted on the surfaces of a hygroscopic material in small quantity, ordinarily from about 0.5 to 3.0%, based on the weight of the hygroscopic material, very adequately performs its intended function of inhibiting coalescence of the hygroscopic particles while adding little, if not at all, to the cost of the conditioned material. The activated mineral owes its efficiency to its high sorptivity, low bulk density and outstanding tenacity to a variety of surfaces when applied thereto in comminuted form. The latter property is probably attributed to the unique acicular crystal structure of the mineral. Other clays have been tried as conditioners but have not been found to be nearly as effective as attapulgite which has met widespread consumer acceptance as a conditioner for some hygroscopic materials and has been favored over diatomaceous earth by many users.

Attapulgite is a hydrous aluminosilicate including magnesium in the lattice. The mineral in the chief constituent of Georgia-Florida fuller's earth which is mined in southwest Georgia and northern Florida. When a substantial portion of the free moisture of attapulgite is eliminated from the mineral by thermal treatment, the gel-forming properties of the mineral are modified whereas complete elimination of gel-forming properties takes place under more severe conditions of activation whereby water is removed from the crystal lattice. When attapulgite is used as a conditioner, it preferably has been activated sufficiently to eliminate completely its gel-forming properties. Attapulgite is distinct in morphology and physical properties from the various montmorillonite minerals which are the chief mineral constituents of bentonite clays.

It has been found, however, that siliceous minerals, and particularly clay minerals such as attapulgite, and certain montmorillonite minerals, have a deleterious effect on the stability of solid hygroscopic ammonia derivatives conditioned thereby. Siliceous mineral conditioners appear to catalyze the decomposition of ammonia derivatives with the result that ammonia fumes emanate from ammoniated compositions conditioned by the siliceous mineral powder. The siliceous minerals useful as conditioners are, in general, essentially neutral and the catalytic degradation of ammonia derivatives intimately associated therewith is thought to be associated with certain sites on the heterogeneous siliceous surface and/or presence of impurities thereon, such sites being reactive with the ammonia derivative. Although quantitatively the ammonia release is small and detracts but little from the nitrogen analysis of the fertilizer, nevertheless, the emanation of ammonia fumes from ammonious solids thus conditioned is sufficient to detract from acceptability of the ultimate conditioned product by the consumer.

Accordingly, a principal object of the subject invention is the provision of compositions including discrete particles comprising hygroscopic ammonia derivatives, said particles being coated with a finely divided siliceous mineral treated to inhibit the tendency of said mineral to promote ammonia release from said discrete particles. A more specific object is to provide a composition including hygroscopic fertilizer granule comprising an ammonia derivative and as a coating therefor a small but effective quantity of a particulate clay mineral, the tendency of said mineral to promote the release of ammonia from said granule being curtailed by an additive which does not interfere with the ability of the mineral to condition the ammonia derivative.

We have discovered that an acidic material capable of forming a stable compound or complex with ammonia is able to inhibit the release of ammonia from a particulate solid hygroscopic ammonia derivative conditioned by a comminuted siliceous material when said acidic material, in small quantity, is distributed on said comminuted siliceous material prior to its use as a conditioner for said ammonia derivative.

Briefly stated, compositions within the purview of our invention include discrete particles of a hygroscopic ammonia derivative, individual particles thereof being conditioned by particles of a sorptive siliceous mineral sufficiently small and present in quantity sufficient to form a continuous sorptive barrier around each particle of said ammonia derivative, said particles of sorptive siliceous mineral having substantially homogeneously distributed on the surface thereof a small but effective quantity of an acidic material capable of forming a stable non-volatile compound or complex with ammonia. The acid additive curtails the ammonia release which would be evidenced in its absence, such ammonia release probably being caused by the presence of reactive sites on the heterogeneous siliceous mineral surface in intimate association with said ammonia derivative. The ability of the siliceous mineral to condition effectively the ammonia derivative is not impaired nor is the ammonia derivative adversely affected in other respects by the presence of the acidic material in intimate association with said siliceous mineral. The acidic material is one which if added directly to the ammonia derivative would react therewith, particularly in the presence of moisture, with deleterious effect. Hence, in compositions within the compass of the subject invention, the siliceous mineral acts to control the reaction which could take place between the ammonia derivative and said acidic additive in the absence of the siliceous mineral. Since the improved properties of the acid-treated siliceous conditioners is largely dependent upon obtaining a uniform distribution of a small quantity of the acidic additive on the surface of the siliceous mineral particles, the effectiveness of such an acid treatment will be determined to large extent by the adequacy of homogenization of the clay and the acid deactivator. A wide range of acidic material capable of forming a stable compound or complex with ammonia are useful in the practice of our invention, the value of such acidic materials in restricting ammonia release varying with specie and quantity of acidic material and also varying with specie of siliceous mineral.

In putting our invention into practice, fertilizer granules are dried and agitated with the comminuted acidulated conditioner for a time sufficient to cause the comminuted conditioner to accumulate on the surfaces of the fertilizer granules and, by virtue of the affinity of the conditioner for the granule surface, to build up a firm compacted layer thereon. The agitation may be carried out at room temperature or at an elevated temperature which is below the fusion temperature of the conditioned ammonious material.

Ammonia derivatives which may be more advantageously conditioned by the acid-treated siliceous mineral include ammonium salts of mineral acids, such as ammonium nitrate, ammonium sulfate, ammonium phosphates, and ammonium chloride as well as organic ammonia derivatives such as urea. Of these compounds ammonium nitrate, urea, ammonium sulfate and ammonium phosphates are widely used per se as fertilizers or as constituents of a mixed fertilizer. Particularly outstanding benefits are evidenced when the ammonia derivative is ammonium nitrate or urea, since the tendency of such compounds to release ammonia in the presence of certain siliceous minerals is most pronounced. It is of course evident that a siliceous mineral conditioner treated to curtail its deleterious effect on ammonium nitrate stability must be essentially devoid of organic material because of the potentially explosive character of ammonium nitrate in the presence of organic matter. These ammonia derivatives or mixtures including ammonia derivatives are supplied to the fertilizer trade as granules, or in some cases as macrocrystals, such granules or macrocrystals preferably lying within the range of from about 5 to 35-mesh although particles of smaller or larger particle size may be benfited by the novel coating material of our invention.

Acidic compounds capable of deactivating the siliceous mineral with respect to the tendency of such a mineral to promote the release of ammonia gas from certain solid ammonia derivatives include inorganic acids, organic acids (except when the siliceous mineral is used in association with ammonium nitrate), and chromium, iron and aluminum salts of mineral acids and hydrates thereof. The acidic additive may be solid, liquid or gaseous. Preferred species are sulfuric acid, hydrochloric acid, aluminum chloride, aluminum sulfate, ferric sulfate and ferric chloride, all preferred species being applicable to treatment of siliceous minerals adapted for the conditioning of ammonium nitrate. Ordinarily satisfactory distribution of a solid additive on the siliceous surface is best insured by distributing said additive on the siliceous surface at a temperature above the fusing point of the additive. Gaseous acids such as $SO_2$ may be used in lieu of their hydrated liquid counterparts although the effectiveness of the deactivation of the reactive sites on the siliceous mineral may be somewhat less effective.

Ordinarily the acidic additive should be added to curtail the ammonia release to the desired level without reducing the pH of the composition to a value at which corrosion problems are encountered. The acid additive should be applied to the mineral in amount sufficient to eliminate the tendency of the mineral to promote ammonia release when used to condition an ammonia derivative yet insufficient to cause acidic gas evolution resulting from reaction of said acid additive with said ammonia derivative. In general, it may be said that the pH value of a slurry of the deactivated conditioner should be not less than about 4.0 and is preferably within the range of from about 5.5 to 6.8. It will be shown hereinafter that the relative effectiveness of deactivation can be correlated directly with neither pH value of the deactivated siliceous conditioner nor free acid value thereof but, rather, seems to be related to the composition of the acidic deactivator and efficacy of distribution on the heterogeneous siliceous surface. Ordinarily the addition of an acidic additive in an amount with the range of a 1 to 15% dosage, and particularly within the range of 1.5 to 10% will produce satisfactory results. The term dosage as used herein refers to the parts by weight of additive per 100 parts by weight of conditioner. The optimum deactivator dosage is best determined experimentally for any combination of siliceous mineral conditioner and deactivator since this value will depend, inter alia, on the presence and strength of reactive sites on the mineral conditioner surface, efficacy of the acid in neutralizing said sites and adequacy of deactivator distribution on the mineral surface.

One of the most outstanding sorptive siliceous conditioners for hygroscopic materials is the clay mineral attapulgite suitably heat-activated to modify its gel-forming properties. Although this mineral, or a clay consisting essentially of the mineral, has met widespread acceptance in the conditioning of a variety of hygroscopic chemicals and fertilizers, nevertheless, the performance of attapulgite in conditioning crystalline ammonia derivatives leaves something to be desired because of the ammonia fumes emanating from such ammonious compounds conditioned by said mineral. The V.M., or volatile matter, of the raw earth as mined is ordinarily about 50%, volatile matter being the loss of weight, expressed on a percentage basis, of the earth when heated to essentially constant weight at about 1800° F. When the V.M. of attapulgite is lowered to about 9 to 14% and preferably to 7% or lower, suitably by heating for about an hour at a temperature within the range of from about 600 to 1000° F., and preferably from about 700 to 950° F., the colloidal properties of the mineral are destroyed. The resultant material is activated and otherwise rendered more valuable than colloidal non-activated earth as a conditioner for hygroscopic material. It will be understood that compositions within the compass of our invention are not restricted to the use of the pure mineral attapulgite since attapulgite as supplied may contain up to about 20% of a montmorillonite mineral plus minor quantities of impurities such as quartz. We have found that very satisfactory results are realized using activated attapulgite ground, preferably by fluid energy milling, to a fineness such that the average equivalent spherical particle diameter is between about 1 and 30 microns, and preferably within the range of 5 to 15 microns (particle size measurements being made by the Andreasen sedimentation method using 2.50 as a value for $\rho$). The material preferably has a low density, typically from 15 to 18 pounds per cubic foot.

Other conditioners which may be improved by the practice of our invention include a non-colloidal high-silica light weight bentonite clay comprising calcium montmorillonite such as is found in Georgia, and sepiolite which is a clay mineral closely resembling attapulgite. Although diatomaceous earth is less prone to promote ammonia release when used as a conditioner for a hygroscopic ammonious material, nevertheless, ammonia release does take place when some types of diatomaceous earth are used and, therefore, some benefits will be realized when the principles of the instant invention are applied thereto. Mixtures of at least one clay mineral and diatomaceous earth or of different clay minerals may be used as conditioners, the minerals being thermally activated when necessary to destroy gel-forming properties or promote sorptivity.

The acidic deactivator may be applied to the mineral prior to, simultaneously with or subsequent to comminution of the mineral. Ordinarily the comminuted mineral will have an average equivalent spherical diameter within the range of 1 to 30 microns and will be more readily treated with the additive prior to or simultaneously with comminution of the mineral.

We preferably admix the comminuted acid-treated mineral after curing, when curing is a processing step, and before the fertilizer is bagged. Excellent results are realized by adding to the fertilizer attapulgite in an amount of the order of from about 0.5 to 3.0% of the weight of the fertilizer, although ordinarily from about 0.5 to 1.5% will suffice to produce outstanding benefits. Somewhat larger amounts of diatomaceous earth may be required to effect a degree of conditioning equivalent to that accomplished by the attapulgite or sepiolite. Of course, the optimum weight ratio of conditioner to fertilizer will depend, inter alia, on the fineness of the coating material, the composition of the fertilizer, the amount of free surface per unit weight of fertilizer and the severity of moisture, temperature and pressure conditions which the conditioner must counteract.

The deactivation of a comminuted conditioner with a liquid acidic material may be accomplished by impregnating or spraying the liquid on the mineral and homogenizing the mineral and acid adsorbate preferably at temperature level sufficient to effect reaction between the acid and reactible metallic constituents of the siliceous mineral. This may be accomplished by impregnating the acidic material on the granular mineral by dripping or spraying while blending in a suitable device, such as, for example, a ribbon blender. The treated mineral is then milled in a fluid energy mill, preferably at a temperature within the range of from about 500 to 600° F. This procedure is applicable when the deactivator is sulfuric acid or other liquid acid. It will be understood, however, that the above-described procedure is merely illustrative of one method of suitable processing and many variations therein may be permitted without impairing the efficacy of the treatment. For example, the heating step to accelerate reaction between the acid and the reactible metallic ions of the mineral may be omitted and such reaction be permitted to slowly advance at room temperature. Likewise milling by other techniques may be employed, although it may be stated that fluid energy milling will ordinarily provide the most satisfactory results. As has been hereinabove mentioned the effectiveness of the acid in deactivating the mineral will depend in large measure on the achievement of uniform distribution of a small quantity of acidic material on the surface of individual particles of mineral.

Treatment of mineral with a solid acidic deactivator, typified by alum, is suitably carried out by preblending the mineral and alum in a cement mixer, followed by fine-grinding the preblended product, such as by air milling at a temperature of 500 to 600° F.

The acidic additive may be in the gaseous state, sulfur dioxide typifying such an additive. The gas may be added to the clay prior or subsequent to the comminution of said clay or simultaneously therewith. Satisfactory results will be realized by injecting the gas into the fluid energy mill during grinding of the clay, such treatment being carried out at room temperature or at an elevated temperature of the order of 500 to 600° F.

Although fluid energy milling is the preferred method of comminution, nevertheless, other fine-grinding devices, well-known to those skilled in the art, may be used in achieving the requisite degree of subdivision of the siliceous mineral.

The following examples are given only for the sake of describing certain embodiments of the invention and are not to be construed as limiting the scope thereof.

EXAMPLE I

A deactivated conditioner for ammonium nitrate was prepared by mixing Attaclay with a 5.6% dosage of $Al_2(SO_4)_3 \cdot 18H_2O$ in a cement mixer. Attaclay is a granular activated grade of attapulgite processed and sold by Minerals & Chemicals Corp. of America having the following properties:

| | |
|---|---|
| V.M. (as produced), percent | 6-8 |
| pH (water slurry) | 7.0-8.0 |
| Av. equiv. spherical diameter_____microns__ | 28 |

The composition of the Attaclay expressed in terms of the oxides present is given below (volatile-free basis):

| | |
|---|---|
| $SiO_2$ | 67.0 |
| $Al_2O_3$ | 12.5 |
| $Fe_2O_3$ | 4.0 |
| MgO | 11.0 |
| CaO | 2.5 |
| Others | 3.0 |
| | 100.0 |

The preblended product was air milled in a fluid energy mill at a temperature of 500 to 600° F. The deactivated attapulgite is used to condition dry ammonium nitrate prills by agitating the prills with 1.5% by weight of acid-treated attapulgite in a rotating drum to cause the earth to accumulate on the surfaces of the fertilizer granules.

EXAMPLE II

Attaclay was processed into a deactivated conditioner by dripping a 1.5% dosage of 96% sulfuric acid (diluted to 30% for the application on Attaclay) while the Attaclay was being blended in a ribbon blender and air milling the blended material in a fluid energy mill at 500 to 600° F. The product is used to condition urea by dusting about 2.5% of conditioner on urea granules and agitating the mixture in a rotating drum to accumulate a compacted coating of conditioner particles around each urea granule.

EXAMPLE III (a) Attaclay deactivated with $SO_2$ gas was prepared by injecting the gas into a fluid energy mill during grinding of the clay at the rate of 22.5 parts by weight of gas per 100 parts of clay. Milling was carried out at 500 to 600° F.

(b) Example III(a) was repeated using 25 parts by weight of gas per 100 parts of clay and fluid energy milling at room temperature.

The products from Example III(a) and Example III(b) proved effective in curtailing ammonia release from ammonium nitrate.

EXAMPLE IV

The ability of various acidic additives to curtail release of ammonia from ammonium nitrate in intimate association with comminuted activated attapulgite (Attaclay) was quantitatively measured. The treatment with alum $(Al_2(SO_4)_3 \cdot 18H_2O)$ was carried out by preblending the attapulgite and aluminum sulfate in a cement mixer, followed by air milling the sample in a fluid energy mill, as in Example I, at a temperature of 500 to 600° F. The Attaclay was impregnated with sulfuric acid by dripping the acid on the clay while being blended in a ribbon blender. The sample was then milled in a fluid energy mill, as in Example II, at 500 to 600° F. Attaclay was treated with sulfur dioxide by injecting the sulfur dioxide gas into the fluid energy mill during grinding of the clay. This treatment was carried out at a temperature of 500 to 600° F., as in Example III(a), and also at room temperature, as in Example III(b).

The ammonia released from ammonium nitrate in the presence of the untreated and treated clay was tested under severe conditions; that is, in the presence of a superabundance of water. Accordingly, 25 grams of each of the treated clay samples treated as hereinabove described was slurried with 25 grams of ammonium nitrate (reagent grade) and 150 cc. of distilled water. The ammonia released by each of these slurries was determined by the Kjeldahl method. The release of ammonia from ammonia nitrate conditioned with untreated Attaclay was determined in the same manner. A blank run was made by determining the ammonia release under similar conditions but in the absence of clay. Also investigated was the release of ammonia from ammonium nitrate in intimate association with Celite 379, diatomaceous earth, sold by Johns Manville, Inc. The pH and free acid values of the various treated and untreated conditioners was determined to investigate the correlation, if any, between these values and inhibition of ammonia release. The free acid was determined by the method described by Taylor and Bassett, J. Chem. Soc. pp. 4431–42 (1952). The pH was ascertained by adding 5 grams of the sample to 100 cc. of water, boiling for 15 minutes, cooling, and measuring the pH meter. The results are tabulated below in Table I.

*Table I*

| Sample No. | Conditioner | Deactivator | Deactivator Concentration, Percent Dosage | Ammonia Release, g./$NH_3$/25 g. Conditioner | Free Acid, Percent $H_2SO_4$ | pH |
|---|---|---|---|---|---|---|
| 1 | None | None | | 0.00002 | | |
| 2 | Diatomaceous earth. | ___do_____ | | 0.0083 | 1.21 | 6.2 |
| 3 | Attapulgite | ___do_____ | | 0.0400 | 0.68 | 7.2 |
| 4 | ____do_____ | Alum | 5.6 | 0.0004 | 1.45 | 4.0 |
| 5 | ____do_____ | ___do_____ | 11.2 | 0.0008 | 1.45 | 3.5 |
| 6 | ____do_____ | $H_2SO_4$ | 4.9 | | 3.88 | 3.1 |
| 7 | ____do_____ | $H_2SO_4$ | 2.4 | 0.0023 | 2.43 | 3.9 |
| 8 | ____do_____ | $H_2SO_4$ | 1.5 | 0.0148 | 1.45 | 6.2 |
| 9 | ____do_____ | $H_2SO_4$ | 1.0 | 0.0231 | 0.97 | 6.7 |
| 10 | ____do_____ | $SO_2$ | (¹) | 0.0278 | 1.94 | 4.8 |
| 11 | ____do_____ | $SO_2$ | (²) | 0.0206 | 1.45 | 6.5 |

¹ 4½#/20# Attapulgite. ² 5#/20# Attapulgite.

Table II

| Conditioner | Evaluation of Conditioned Ammonium Nitrate Prills | | | | Characteristic of Prills After 2 Month Storage | |
|---|---|---|---|---|---|---|
| | Treatment | Percent Treatment | pH | Ammonia Released, g./NH$_3$/25 g. Conditioner ×10$^2$, Av. | In Sealed Bottles | In Sealed Bottles, 1% Water Added |
| Diatomaceous earth | None | | 6.2 | 0.83 | No odor | No odor, caked hard. |
| Attapulgite | do | | 7.2 | 3.98 | NH$_3$ odor | NH$_3$ odor, not caked. |
| Do | Alum | 1.5 | 5.8 | 2.35 | No odor | No odor, not caked. |
| Do | do | 3.0 | 4.9 | 0.10 | do | Do. |
| Do | do | 5.6 | 3.5 | 0.047 | do | No odor, slightly caked. |
| Do | do | 11.2 | 3.5 | 0.075 | do | No odor, medium caking. |
| Do | H$_2$SO$_4$ | 1.0 | 6.7 | 2.30 | Slight acid odor | No odor, not caked. |
| Do | H$_2$SO$_4$ | 1.5 | 6.2 | 1.49 | No odor | Do. |
| Do | H$_2$SO$_4$ | 2.4 | 3.9 | 0.22 | do | Slightly acid odor, not caked. |
| Do | H$_2$SO$_4$ | 4.9 | 3.1 | 0.014 | do | Do. |
| Do | SO$_3$(hot) | | 4.8 | 2.78 | do | No odor, medium caking. |
| Do | SO$_2$(cold) | | 6.5 | 2.06 | do | No odor, slightly caked. |
| No conditioner | | | | | Slight acid odor | No odor, caked hard. |

The tabulated results indicate that all the deactivators tested had a beneficial effect on the attapulgite conditioner and served to reduce substantially the ammonia release from ammonium nitrate in association with the attapulgite. A correlation of the free acid and pH values with measurements of ammonia release indicate that there exists no obvious relationship between pH or free acid value and inhibition of ammonia release. Rather the results indicate that the deleterious effect of the clay on the stability of ammonium nitrate is related to a phenomenon associated with the clay surface and that the deactivator functions by neutralizing these sites rather than acting solely as an absorbent for ammonia.

EXAMPLE V

Ammonium nitrate prills were coated with a series of conditioners, using 3% conditioner, based on the weight of the prills. Conditioners included diatomaceous earth, activated attapulgite and activated attaplgite treated with a variety of acid treating materials. Each sample of conditioned prills was divided in two portions, one of the portions being stored in a sealed bottle and the other being mixed with 1% water (to accelerate chemical reaction) and stored in a sealed bottle. An in vitro study was conducted to determine caking tendency of each sample and ammonia release therefrom after a storage period of 2 months.

The materials used and the results are tabulated in Table II.

It will be understood that the invention as above-described is susceptible to numerous variations without departing from the spirit and scope of the invention.

We claim:

1. A composition of matter comprising discrete particles of a solid hygroscopic mineral ammonium salt which tends to decompose with evolution of ammonia in the presence of a sorptive siliceous mineral, individual particles of said ammonium salt being coated with from about 0.5 to 3 percent by weight, based on the weight of said ammonium salt, of a finely divided sorptive siliceous mineral having intimately associated with the surface thereof from 1 to 10 percent by weight, based on the weight of the siliceous mineral, of a mineral acidic substance capable of reacting with ammonia to form a stable nonvolatile compound therewith, said siliceous mineral being further characterized by having been treated with said mineral acidic substance prior to the coating of said ammonium salt therewith.

2. A composition of matter comprising discrete particles of a solid hygroscopic ammonia derivative which tend to decompose with evolution of ammonia in the presence of a sorptive siliceous mineral, individual particles of said ammonia derivative being coated with from about 0.5 to 3 percent by weight, based on the weight of said ammonia derivative, of a finely divided sorptive siliceous mineral having distributed on the surfaces thereof from 1 to 10 percent by weight, based on the weight of the siliceous mineral, of an inorganic acidic substance capable of reacting with ammonia to form a stable nonvolatile compound therewith, said inorganic acidic substance having been distributed on the surfaces of said siliceous mineral prior to the coating of said ammonia derivative with said siliceous mineral.

3. The composition of claim 2 in which the siliceous mineral is attapulgite.

4. The composition of claim 2 in which the siliceous mineral is diatomaceous earth.

5. The composition of claim 2 in which the siliceous mineral is montmorillonite.

6. The composition of claim 2 in which the siliceous mineral is sepiolite.

7. A composition of a matter comprising discrete particles of a mixed fertilizer including, as a constituent, an ammonium salt of a mineral acid which ammonium salt tends to decompose with evolution of ammonia in the presence of a sorptive siliceous mineral and which particles tend to coalesce due to heat, pressure or moisture, individual particles of said mixed fertilizer being coated with from about 0.5 to 3 percent by weight, based on the weight of said mixed fertilizer, of a finely divided sorptive siliceous mineral having distributed on the surfaces thereof from 1 to 10 percent by weight, based on the weight of the siliceous mineral, of an inorganic acidic substance capable of reacting with ammonia to form a stable nonvolatile compound therewith, said inorganic acidic substance having been distributed on the surfaces of said siliceous mineral prior to the coating of said mixed fertilizer with said siliceous mineral.

8. The composition of claim 7 in which the inorganic substance is sulfuric acid.

9. The composition of claim 7 in which the inorganic substance is hydrochloric acid.

10. The composition of claim 7 in which the inorganic substance is aluminum sulfate.

11. The composition of claim 7 in which the inorganic substance is sulfur dioxide.

12. The composition of claim 7 in which the inorganic substance is ferric sulfate.

13. A composition of matter comprising discrete particles of a mixed fertilizer including, as a constituent, ammonium nitrate, individual particles of said mixed fertilizer being coated with from about 0.5 to 3 percent by weight, based on the weight of said mixed fertilizer, of finely divided activated attapulgite having distributed on the surfaces thereof from 1 to 10 percent by weight, based on the weight of the attapulgite, of an inorganic acidic substance capable of reacting with ammonia to form a stable nonvolatile compound therewith, said inorganic acidic substance having been distributed on the surfaces of said siliceous mineral prior to the coating of said mixed fertilizer with said siliceous mineral.

14. The composition of claim 13 in which the inorganic acidic substance is sulfuric acid.

15. The composition of claim 13 in which the inorganic acidic substance is aluminum sulfate.

References Cited in the file of this patent

UNITED STATES PATENTS

| | | |
|---|---|---|
| 1,932,434 | Wyler | Oct. 31, 1933 |
| 1,939,165 | Eisser | Dec. 12, 1933 |
| 2,399,987 | Cordie et al. | May 7, 1946 |
| 2,502,996 | Rohner | Apr. 4, 1950 |
| 2,690,389 | Studebaker | Sept. 28, 1954 |
| 2,702,747 | Studebaker | Feb. 22, 1955 |
| 2,991,170 | Szepesi et al. | July 4, 1961 |
| 3,077,395 | Ridgeway | Feb. 12, 1963 |